United States Patent [19]

Hough et al.

[11] 4,392,189

[45] Jul. 5, 1983

[54] FRONT LOADING PROJECTION UNIT WITH THREADED RESILIENT RETENTION MEMBER

[75] Inventors: Harold L. Hough, Beverly; Ronald G. Blaisdell, Saugus, both of Mass.

[73] Assignee: GTE Products Corporation, Stamford, Conn.

[21] Appl. No.: 212,469

[22] Filed: Dec. 3, 1980

[51] Int. Cl.³ ............................................... F21V 7/00
[52] U.S. Cl. ..................................... 362/306; 362/226; 362/440
[58] Field of Search ............... 362/226, 257, 296, 389, 362/396, 306, 263, 350, 440

[56] References Cited

U.S. PATENT DOCUMENTS 1,848,812  3/1932  Wiley ................................. 362/208
4,219,870  8/1980  Haraden ............................. 362/226

Primary Examiner—Donald P. Walsh
Attorney, Agent, or Firm—Lawrence R. Fraley

[57] ABSTRACT

An improved projection unit including a glass reflector and a capsule member (tungsten halogen lamp and metallic retention member) removably positioned within the reflector. The projecting end of the metal retention member is threaded only on two sides and adapted for having a single thread annular nut positioned thereon to retain the capsule securely within the reflector. The nut is resilient to assure that damage to the reflector, boxlike members, or nut itself is prevented, and also to compensate for thermal expansion.

7 Claims, 3 Drawing Figures

FRONT LOADING PROJECTION UNIT WITH THREADED RESILIENT RETENTION MEMBER

DESCRIPTION

1. Technical Field

The invention relates to incandescent lamp and glass reflector combinations for use in projection systems such as 16 mm. movie and slide projectors.

2. Background

In many projection units which include a preformed glass reflector and projection lamp (e.g. tungsten halogen) therein, the lamp is retained in alignment within the reflector by employing a suitable cement (e.g. sauereisen) within the reflector and about the lamp's sealed end. Examples of such arrangements are shown in U.S. Pat. Nos. 3,314,331 (Wiley) and 3,639,750 (Anthonijsz). Use of cement or a similar permanent-type bonding agent prohibits separation of the lamp and reflector in the event that replacement of either of these components is necessary. In almost all cases, it is only the incandescent lamp which fails and needs replacement. The aforementioned permanent bond between lamp and glass reflector was believed necessary in order to assure the essential, precise alignment between said components and between these members and other elements (e.g. film gate, projection lens) within the overall system. Alignment between reflector and lamp was usually achieved using a precisioned instrument whereupon the assembled unit was ready for insertion within a respective socket-holder arrangement, such as shown in U.S. Pat. No. 3,789,212 (Wagner). This latter positioning is usually accomplished by the projector's operator.

Mandatory replacement of both lamp and glass reflector therefore results in unnecessary waste of material which in turn adds appreciably to the overall cost of operating such systems.

The projection unit of U.S. Pat. No. 4,156,901 (Haraden et al) was designed to eliminate the above undesirable requirement by providing a retention member which is removable from the rear of the reflector yet which also assures positive alignment of the unit's incandescent lamp within the reflector when said lamp is positioned therein. The retention member is secured to the lamp's sealed end and may comprise a metallic "can", a preformed component of insulative material such as ceramic, or a combination of both.

The projection unit of U.S. Pat. No. 4,219,870 (Haraden et al) was designed as an improvement to the unit of U.S. Pat. No. 4,156,901 by providing means whereby the retention member having the lamp's sealed end therein could be removed from the front, concave reflecting portion of the glass reflector. As stated, the method of removal in U.S. Pat. No. 4,156,901 was via the rear neck (or collar) portion of the reflector. This earlier arrangement necessitated provision of a relatively large aperture (opening) in the reflector's neck portion thus reducing the total reflective surface of the reflector and, as a result, the unit's total forward output. In addition, rearward removal of the lamp in many projection systems currently available today can prove somewhat difficult due to the limited accessibility to this portion of the unit within most systems. The technique of forward (front) removal understandably overcomes the above and other, related disadvantages. In the unit defined in U.S. Pat. No. 4,219,870, a pair of retention members is utilized, one for retaining the sealed end of the lamp and aligning the lamp within the glass reflector while the other, an external clamping member, is slidably positioned within a pair of opposing, exterior slots in the glass reflector's neck portion and functions by slidably engaging upstanding tabs located on the portions of the boxlike first retention member which protrude from the rear of the reflector a necessary distance.

The present invention represents yet another improvement of the variety above by providing a projection unit which permits use of a relatively small opening in the glass reflector to accommodate the unit's lamp and first retention member, both of which are removable from the front of the reflector, and which utilizes a relatively small, compact resilient second retention member rotatively positioned on an external surface of the first member. This second member, preferably an annular spring nut which is threaded on the first member, engages the rear neck portion of the glass reflector to provide retention of the first member within the reflector.

It is believed therefore that a projection unit which provides the above improvements, as well as those defined in greater detail below, constitutes a significant advancement in the art.

DISCLOSURE OF THE INVENTION

It is therefore a primary object of the present invention to enhance the projection unit art by providing a projection unit which permits ready separation of the unit's projection lamp and glass reflector components and which also provides the several advantageous features described herein.

In accordance with one aspect of the invention, there is provided an improved projection unit which includes a glass reflector, an incandescent projection lamp, a first retention member which is removably oriented within the glass reflector and serves to align the lamp within the reflector, and a second retention member for retaining the first member within the glass reflector and permitting removal thereof through the reflector's front portion. The improvement to the unit comprises providing a second retention member which is resilient and is rotatively positioned on an external surface of the first member for engaging a surface (e.g., back wall) of the glass reflector to effect retention of the first member within the reflector. The second retention member is also capable of being readily removed from the first retention member.

BEST MODE FOR CARRYING OUT THE INVENTION

For a better understanding of the present invention together with other and further objects, advantages and capabilities therefor, reference is made to the following disclosure and appended claims in connection with the above-described drawings.

Figure 1:
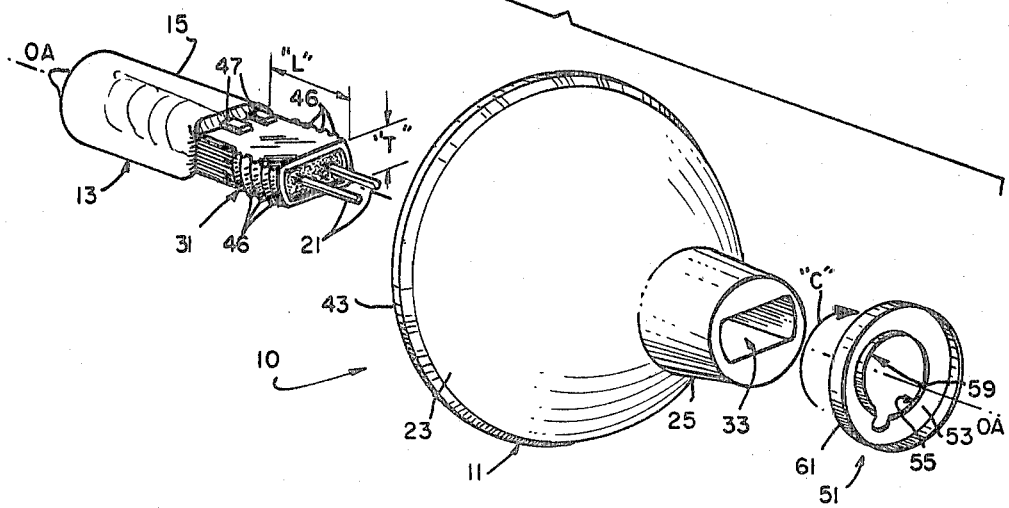
FIG. 1 is an exploded isometric view of a projection unit in accordance with a preferred embodiment of the invention.
Figure 2:
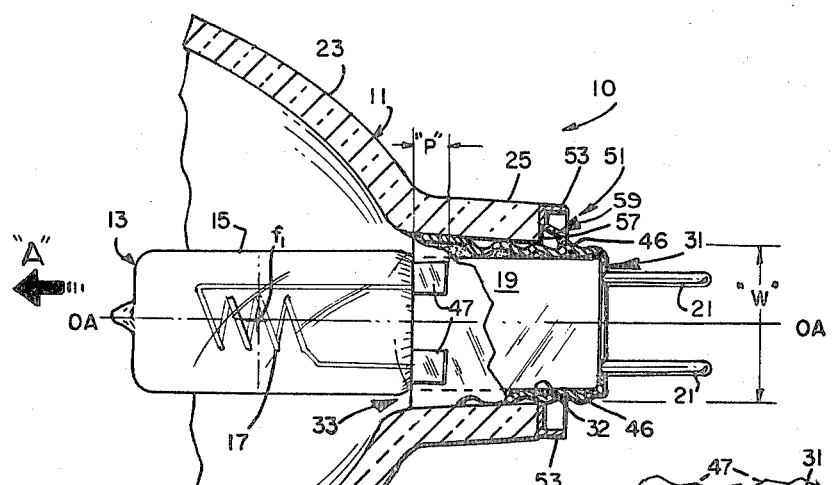
FIG. 2 is an enlarged, partial top plan view, partly in section, illustrating the positioning of the lamp and first retention member components of the invention within the opening provided within the invention's glass reflector, and the manner of retention provided by the second retention member of the invention.

With particular reference to FIGS. 1 and 2, there is illustrated a projection unit 10 in accordance with a preferred embodiment of the present invention. As stated, unit 10 is particularly adapted for use within a projection system such as a slide or 16 mm. movie projector. Accordingly, projection unit 10 would be located within a suitable socket-holder assembly (not shown) such as described and shown in the aforementioned U.S. Pat. No. 3,789,212. Projection unit 10 includes a glass reflector 11 and an incandescent projection lamp 13 adapted for being located within reflector 11 (FIG. 2). A preferred lamp for use in unit 10 is one of the tungsten-halogen variety listed under ANSI Code ELH, and produced and sold by the assignee of the invention. This lamp produces 300 watts, is operable at normal line voltages, and possesses an average life of 35 hours. The envelope portion 15 of lamp 13 includes a CC8 tungsten filament structure 17 which is electrically connected within the lamp's press sealed end 19 (adjacent envelope 15) to a pair of contact pins 21 which project from end 19. Lamp 13 is thus activated when pins 21 are connected to a suitable socket component (not shown) and the corresponding projection system placed in operation. Other lamps suitable for use in unit 10 include those listed under ANSI Code ENH and ENX, said lamps also produced and sold by the assignee of this invention. ENH lamps operate at normal line voltages and are capable of producing 250 watts over an average life of 175 hours. ENX lamps produce 360 watts, operate at 82 volts, and are rated as having an average life of 75 hours. Both ENH and ENX type lamps utilize a CC8 filament structure. Still other lamps for use in unit 10 include those producing from between about 80 to about 250 watts and operational at the relatively low voltage ranges of between about 12 and about 24 volts and sometimes even lower. Lamps of this type typically use C6 or CC6 filaments and have an average operating life of between 25 and 1000 hours. These latter defined lamps are listed under such ANSI Code designations as EJA, EMJ, EJN, EJL, DED and ELC. The contact pins 21 typically employed in tungsten halogen lamps of the variety described above are of molybdenum or similar conductive material.

Reflector 11 is preferably made of hardglass (e.g., boro-silicate) and includes a forward (or front) concave reflecting portion 23 and a hollow rear neck portion 25 adjacent thereto. Reflecting portion 23 is preferably elliptical or parabolic in configuration and includes a dichroic mirror coating (not shown) on its interior surface to permit much of the heat generated by lamp 13 to pass therethrough while still reflecting the lamp's visible light output in a forward direction "A". Such coatings are known in the art and typically can withstand temperatures of 500 degrees Celsius with no resultant shift in characteristics.

As earlier stated, alignment between lamp 13 and reflector 11 is extremely critical in order to assure optimum forward output of unit 10. Understandably, alignment is also critical between unit 10 and the remaining elements of the overall projection system, such as the projector's film gate and projection lens. Such elements are well known in the prior art and are not illustrated here. To maintain said alignment between lamp 13 and reflector 11, a first retention member 31 is utilized and is fixedly secured to sealed end 19 of lamp 13 using, for example, a suitable bonding cement 32 (e.g. saureisen). Member 31, as illustrated, is metallic (e.g., No. 26 ga. steel) and is of a substantially boxlike configuration to thus encapsulate almost the entirety of sealed end 19. The function of member 31 is to retain lamp 13 in alignment within reflector 11 such that the envelope is oriented within concave portion 23 of reflector 11 and the lamp's sealed end 19 is located substantially within neck 25.

Figure 3:
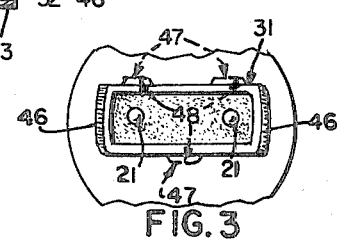
FIG. 3 is a rear elevational view of the first retention member of the invention as shown projecting from the end of the rear portion of the reflector of the invention.

To accommodate retention member 31 (and therefore the sealed end 19 of lamp 13), rear neck portion 25 of reflector 11 includes a relatively small opening 33 therein. As stated, use of a small opening results in an increase in total internal reflective area to in turn provide a corresponding increase in total forward light output for the invention in comparison to the unit depicted in the aforementioned U.S. Pat. No. 4,156,901. Opening 33 is substantially rectangular in cross section to accommodate the similarly shaped boxlike member 31. In addition, this opening also includes a plurality of slots and grooves therein which function in the manner defined below. It should be noted that two opposed surfaces of the substantially rectangular opening 33 are slightly curved (see FIG. 3), for reasons provided hereafter.

As yet another improvement, it can be seen in FIG. 2 that a relatively large amount of glass material is provided in the sides of neck portion 25 of reflector 13, as well as the juncture location between concave portion 23 and neck 25. Added use of such material serves to strengthen reflector 13 in these area, thus facilitating both handling and shipping of said component.

Lamp 13 is retained within reflector 11 such that the CC8 filament structure 17 lies on the reflector's optical axis OA—OA and in the focus ($f_1$) of the ellipse of the reflector. In this position, the longitudinal axis of lamp 13 lies coincidental to axis OA—OA.

Located along each of the opposite sides of boxlike retention member 31 are a series of threads 46 which each follow the slightly curvilinear shape of each side. First member 31 thus includes two sections of threads 46 which project from the respective side in which they are formed and are able to fit within opening 33 during lamp insertion without the necessity of providing a separate channel or slot to accommodate this part of the invention. As shown in FIG. 2, threads 46 extend from the rear of reflector 11 to function in the manner defined below.

Positioning of member 31 is also facilitated by the provision of a pair of upstanding portions 47 on one (top or bottom) of the sides of member 31 which interconnect the somewhat curvilinear sides having threads 46, said portions 47 aligning with and being positioned within a corresponding pair of slots 48 (hidden, FIG. 3) which extend back into opening 33 a preestablished distance from a front surface 43 of reflector 11. Located on a side of member 31 opposed to the side containing the two upstanding portions 47 is yet another upstanding portion 47 which also aligns with and is positioned within a corresponding slot 48 within the bottom surface of rear opening 33. This lower slot extends the same depth (from front surface 43) as opposed, upper slots 48. The described three-point relationship of upstanding portions 47 and corresponding slots 48, in addition to assuring a precise depth of insertion of retention member 31 as well as preventing undesirable (e.g., rotational) movement thereof while said member is positioned within reflector 11, assures that the projector's operator will consistently locate lamp 15 and similar such components (in case of replacement) in the same orientation.

In the arrangement depicted in the drawings, boxlike retention member 31 is thus designed to fit snugly within opening 33 to provide the described necessary, critical alignment. To prevent this member from becoming displaced as might occur from the vibrations or other movements typically experienced in the operation and handling of projection systems, the invention includes a second retention member 51 which represents a significant improvement over the member described and illustrated in the aforementioned U.S. Pat. No. 4,219,870. Member 51, as will be described, is resilient in nature and is rotatively positioned on the threaded portion of the external surface of boxlike retention member 31 which projects from the extreme rear of reflector 11. Member 51 is an annular single threaded spring nut 53 including an internal round aperture 55 having a diameter approximately the same as that of threads 46 (if threads 46 were to be extended). Member 51 is thus threaded onto the extending, threaded segments of member 31 (in clockwise direction "C") to engage the flat back or rear surface 57 of annular rear portion 25 and lie substantially flush thereagainst to effect securement of first member 31. As stated, spring nut 53 is resilient. By this is meant that exact positioning thereof on member 31 is not absolutely essential provided the aforedescribed flush relationship is achieved. Thus, some play is provided such that if the operator slightly overtightens nut 53, it will not become permanently deformed nor will it disfigure threads 46. Nor will such motion cause harm to the glass reflector, particularly by the members 47. Nut 53, being metallic and resilient, thus also is able to compensate for thermal expansion when exposed to the relatively warm temperatures typically generated by projection units such as defined herein. This unique means of securement is achieved by providing nut 53 with a thread 59 which is offset slightly from the plane of the forward surfaces of the nut which lie flush against back surface 57. Thread 59 has its origin along said plane but thereafter extends rearwardly (from the forward plane) until reaching a maximum offset of about 0.038 inch. Use of a thin metallic material (preferably #410 stainless steel having a thickness of only 0.007 inch) assures that this offset region will provide the necessary degree of resilience required. In one embodiment of the invention, nut 53 had an external diameter of about 0.687 inch and aperture 55 had a diameter of about 0.470 inch. Nut 53 also preferably includes a flange portion 61 which can of course be notched (not shown) or similarly treated to facilitate rotation. In comparison, boxlike retention member 51 includes a length "L" of about 0.600 inch, a maximum width "W" (at threads 46) of about 0.500 inch, and a thickness "T" of only about 0.200 inch. Each of the portion 47 extend (dimension "P") about 0.125 inch from the front of the member. The preferred pitch for threads 46 is 0.100 inch with each having a depth of 0.015 inch.

It can thus be seen that the overall size of boxlike member 31 is extremely small to in turn assure that corresponding opening 33 can also be small, thereby permitting a maximum in available internal reflective surface for reflecting portion 23. As shown and described, this compact design is possible while still assuring the threaded form of securement by the invention's second retention member, annular nut 51.

There has thus been shown and described a substantially improved means for positively retaining a lamp capsule (tungsten-halogen lamp and metallic "can" member) within an opening located within the rear neck or collar portion of a glass reflector and for permitting facile removal thereof through the reflector's forward reflecting portion. The design as described and illustrated herein permits ease of interchangeability with other units as well as permitting ready positioning of the invention within many existing socket-holder assemblies (e.g., as shown in U.S. Pat. No. 3,789,212) without modification thereto. Removal of the capsule is accomplished in a simple manner, it only being necessary to remove the annular spring nut from member 31, and thereafter grasp the glass envelope 15 of the lamp and pull it in a forward direction. Provision of a resilient means of securement also assures that positive retention of the lamp and boxlike first retention member (both forming a capsule component) is possible without causing damage to the reflector, nut, or boxlike members.

While there has been shown and described what are at present considered the preferred embodiments of the invention, it will be obvious to those skilled in the art that various changes and modifications may be made therein without departing from the scope of the invention as defined by the appended claims. For example, it is possible to vary the number and shapes of the invention's upstanding portions 47 while still assuring the features cited herein. As an example, the lower portion 47 (FIG. 3) could be substantially larger than the two corresponding upper portions.

We claim:

1. In a projection unit including a glass reflector having a front concave reflecting portion and a rear neck portion with an opening therein, an incandescent lamp including an envelope portion and a sealed end adjacent said envelope portion, a first retention member secured to said sealed end of said lamp for retaining said lamp therein and aligning said lamp within said reflector whereby said envelope portion will be positioned substantially within said front concave reflecting portion and said sealed end will be positioned substantially within said opening within said rear neck portion, said first retention member removably positioned within said opening and adapted for being removed through said front concave reflecting portion of said reflector, and a second retention member for retaining said first retention member within said opening of said reflector and permitting removal thereof through said front concave reflecting portion, the improvement wherein said second retention member comprises:

a resilient member rotatively positioned on an external surface of said first retention member and capable of being removed therefrom, said rotative member engaging said rear neck portion of said reflector to effect said retention of said first retention member within said opening of said reflector once said first retention member is fully inserted within said reflector opening, said first retention member being of substantially boxlike configuration and having first and second threaded sections on opposite sides thereof, said resilient member comprising a substantially annular spring nut threaded on said threaded sections to provide said retention.

2. The improvement according to claim 1 wherein said boxlike first retention member includes a plurality of upstanding portions located on a pair of opposed sides thereof other than said opposite sides having said threaded sections, and said openings within said rear portion of said reflector includes a plurality of slots therein each for accommodating a respective one of said upstanding portions when said first retention member is positioned within said opening.

3. The improvement according to claim 2 wherein the number of said upstanding portions is three, two of said upstanding portions being located in one of said opposed sides of said first retention member and the other of said upstanding portions being located on a second of said opposed sides.

4. The improvement according to claim 1 wherein said rear neck portion of said glass reflector is of substantially annular configuration and includes a substantially planar rear surface, said annular spring nut engaging said planar surface and lying substantially flush thereagainst to effect said retention of said first retention member.

5. The improvement according to claim 1 wherein said opening within said reflector for having said first retention member positioned therein is substantially rectangular in cross section and includes two opposed surfaces of slight curvature.

6. The improvement according to claim 1 wherein said spring nut is metallic.

7. The improvement according to claim 4 wherein said spring nut includes a thread slightly offset from the plane of the forward surfaces of said nut, said forward surfaces engaging said planar rear surface of said reflector to provide said flush engagement therewith during said retention of said first retention member.

* * * * *